US009569178B1

(12) United States Patent
Barsness et al.

(10) Patent No.: US 9,569,178 B1
(45) Date of Patent: *Feb. 14, 2017

(54) FUSION RECOMMENDATION FOR PERFORMANCE MANAGEMENT IN STREAMS

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,679

(22) Filed: Sep. 29, 2015

Related U.S. Application Data

(63) Continuation of application No. 14/838,585, filed on Aug. 28, 2015.

(51) Int. Cl.
*G06F 9/44* (2006.01)
(52) U.S. Cl.
CPC ...................................... *G06F 8/20* (2013.01)
(58) Field of Classification Search
CPC ........................................................ G06F 8/20
USPC ........................................................ 717/105
See application file for complete search history.

(56) References Cited

U.S. PATENT DOCUMENTS

| | | | |
|---|---|---|---|
| 8,490,072 B2 * | 7/2013 | Andrade | G06F 8/433 717/132 |
| 8,566,793 B2 | 10/2013 | Ahadian et al. | |
| 8,769,485 B2 * | 7/2014 | Salz | G06F 8/30 717/105 |
| 8,776,010 B2 | 7/2014 | Fisher et al. | |
| 8,793,653 B2 | 7/2014 | Balasubramanian et al. | |
| 8,806,510 B2 * | 8/2014 | Andrade | G06F 9/5066 719/313 |
| 8,850,383 B2 | 9/2014 | Adams et al. | |
| 8,869,097 B2 * | 10/2014 | Asadullah | G06F 8/33 717/101 |
| 8,984,493 B2 * | 3/2015 | Pistoia | G06F 8/75 717/131 |

(Continued)

OTHER PUBLICATIONS

IBM, "Method for Integrated Development Environment (IDE) Content Assist by Team Popularity", An IP.com Prior Art Database Technical Disclosure. Original Publication Date: Nov. 12, 2009. IP.com No. 000189556, 2 pages.

(Continued)

*Primary Examiner* — Lewis A Bullock, Jr.
*Assistant Examiner* — Theodore Hebert
(74) *Attorney, Agent, or Firm* — Laura E. Gisler

(57) ABSTRACT

Fusion hints can be generated in order to recommend streams application actors (like streams operators) for fusion or separation in a streams computing environment. Profiles can be made for the streams application actors, and fusion candidates can be determined from the profiles, based on fusion candidate rules. Based on the fusion candidate rule satisfied, a particular associated fusion recommendation can be identified and made to the user via a user interface. The recommendation can be displayed, along with the identities of the streams application actors identified as fusion candidates.

11 Claims, 13 Drawing Sheets

(56) References Cited

U.S. PATENT DOCUMENTS

| | | | |
|---|---|---|---|
| 2010/0293535 A1* | 11/2010 | Andrade | G06F 8/44 717/156 |
| 2010/0325621 A1* | 12/2010 | Andrade | G06F 8/433 717/156 |
| 2011/0061060 A1* | 3/2011 | Andrade | G06F 9/5066 719/313 |
| 2012/0047101 A1* | 2/2012 | Branson | G06N 5/02 706/47 |
| 2012/0110042 A1* | 5/2012 | Barsness | G06F 17/30289 707/825 |
| 2012/0174061 A1 | 7/2012 | McCollum et al. | |
| 2012/0311562 A1* | 12/2012 | Wang | H04L 67/22 717/177 |
| 2013/0247052 A1* | 9/2013 | Ali | G06F 8/30 718/102 |
| 2013/0263090 A1 | 10/2013 | Polk et al. | |
| 2013/0268912 A1* | 10/2013 | Kizhakkevalappil | G06F 8/34 717/109 |
| 2014/0075364 A1 | 3/2014 | Bragdon et al. | |
| 2014/0282097 A1* | 9/2014 | Edlund | G06Q 10/103 715/753 |
| 2014/0289738 A1 | 9/2014 | Paliwal et al. | |

OTHER PUBLICATIONS

Mell et al., "The NIST Definition of Cloud Computing", National Institute of Standards and Technology, U.S. Department of Commerce, Special Publication 800-145, Sep. 2011, 7 pages.

Muslu et al., "Improving IDE Recommendations by Considering Global Implications of Existing Recommendations", ICSE 2012, New Ideas and Emerging Results, Zurich, Switzerland, pp. 1349-1352, Copyright 2012 IEEE.

Barsness et al., "Fusion Recommendation for Performance Management in Streams", U.S. Appl. No. 14/838,585, filed Aug. 28, 2015.

List of IBM Patents or Patent Applications Treated as Related, dated Sep. 25, 2015, pp. 1-2.

Al et al., "iArch—An IDE for Supporting Abstraction-aware Design Traceability", Kyushu University, Fukuoka, Japan, 2014, 6 pages.

\* cited by examiner

FUSION RECOMMENDATION FOR PERFORMANCE MANAGEMENT IN STREAMS

BACKGROUND

The present disclosure relates to stream computing, and more particularly to the use of an integrated development environment in streams computing.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

An integrated development environment (IDE) may be a software application that provides facilities to computer programmers for software development. An IDE may be designed to facilitate programmer productivity. An IDE may consist of a source code editor, build automation tools, and a debugger. An IDE may also have intelligent code completion capabilities.

While database systems that are configured to analyze large amounts of streaming data efficiently in real time may provide a number of benefits, their introduction to the development world is relatively new. Thus, programmers and developers may be unfamiliar with a data streaming environment, which can make it difficult for developers to best design, troubleshoot, and optimize a system. Without an advanced understanding of arrangement and compartmentalization of streams operations in a streams operator graph, many of the benefits of streams applications may be lost.

SUMMARY

Embodiments of the present disclosure may be directed toward a method for recommending streams application actors for fusion, where the streams application actors are dispersed on an operator graph within a streaming environment. A system may generate a streams application actor profile for each of two or more streams application actors. The two or more streams application actors may be determined to be fusion candidates, based on the streams application actors satisfying a fusion candidate rule. Each of the fusion candidate rules may be associated with one or more fusion recommendations. A fusion recommendation associated with the rule may be identified and an identity of each of the two or more streams application actors along with the fusion recommendation may be displayed. Embodiments of the present disclosure may also be directed toward a system or computer program product for recommending streams application actors for fusion.

Advantages of the invention over other art includes the ability to hint to developers an improvement or improvements for the streams system. Rather than requiring a developer have full understanding of both the streams coding environment as well as the current deficiencies or strengths of a particular streams operator graph, the system can identify fusion candidates and make recommendations to combine or separate the streams application actors according to parameters. In this way, a developer can make modifications and improvements to a system using current and informed metrics.

In some embodiments, the fusion recommendation may be to fuse the fusion candidates together in the same processing element. In other embodiments, the fusion recommendation may be to separate the two fusion candidates from the same processing element. For example only, some of the data in the streams application actor profile on which the fusion candidates can be identified can include historical central processing unit (CPU) usage, processing time, tuple rates, machine configuration, and current CPU usage. In this way, in some embodiments of the disclosed, the system can analyze historical and real time data like CPU usage and processing time when determining which streams application actors can be identified as fusion candidates. This data or analysis of this data can be provided to a developer so the developer can make informed decisions.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
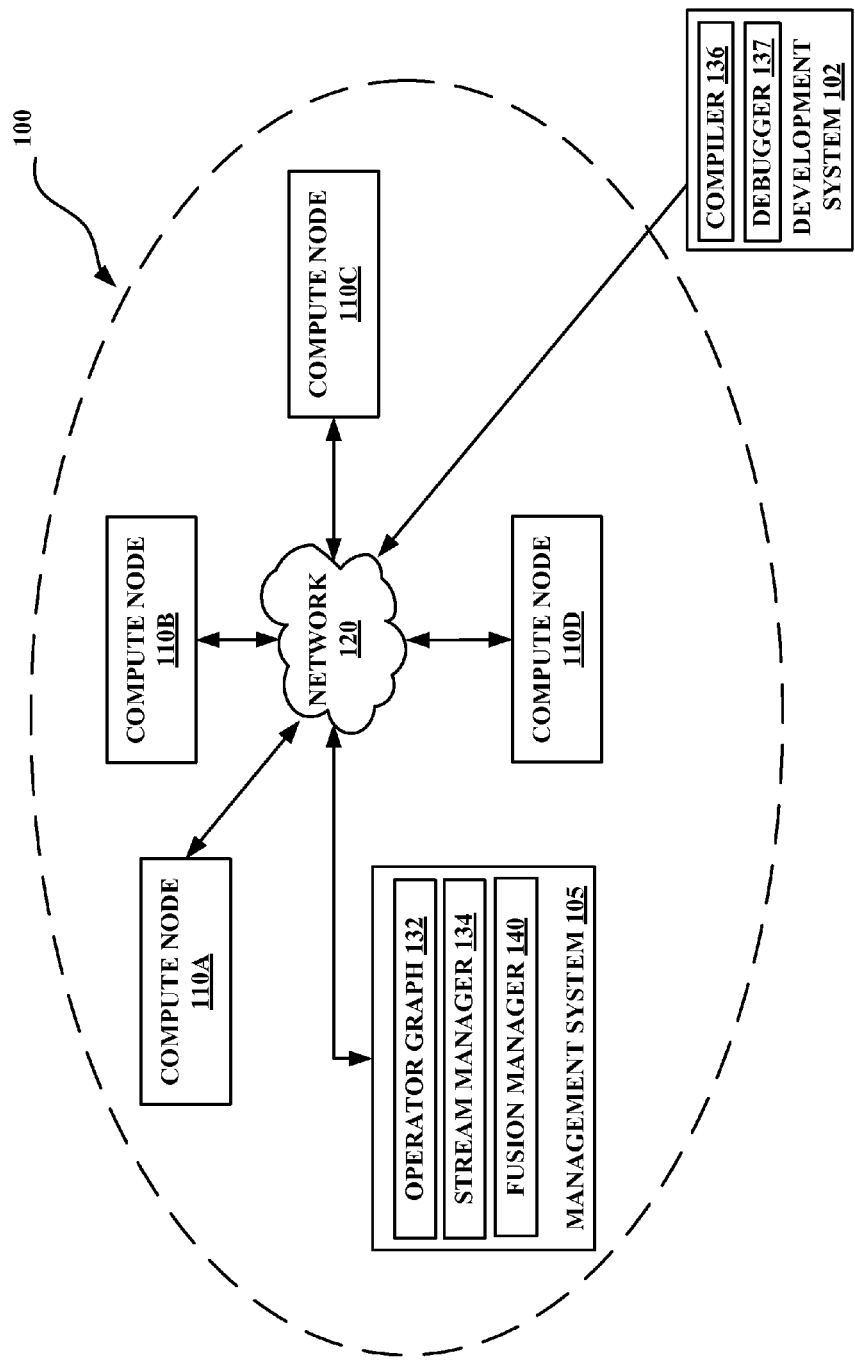
FIG. 1 illustrates a computing infrastructure configured to execute a stream computing application, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to stream computing, and in particular, to the use of an integrated development environment in streams computing. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average.

In stream based computing, as described herein, computing applications may be distributed over a series of nodes by distributing processing elements that are connected together. Thus, a streams computing environment may deviate from a traditional computing environment. As such, a computer programmer may not understand performance implications of the streams environment, including underutilized CPU usage and distribution of processing tasks over a variety of streams application actors (e.g., operators, processing elements, or others). Processing tasks could also be distributed over a variety of streams operators including functors, joins, or other operators designed for a particular task or tasks.

In particular, fusion, a process where streams application actors can be joined together within a single actor, may be recommended to a programmer in order to better distribute executables. Alternatively, separation of streams application actors may be recommended to a programmer. These recommendations, referred to herein as fusion recommendations, may be made in a performance management system or on a user interface as part of an integrated development environment.

These fusion recommendations may recommend two or more streams application actors as fusion candidates. Fusion candidates may be streams application actors (e.g., operators) that are recommended to be fused together or be separated from each other or from a particular configuration (e.g., a same processing element). In this way, a fusion recommendation may indicate or "hint" at a combination or separation of fusion candidates, as is appropriate based on parameters and described herein.

The streams application actors may be identified as fusion candidates based on profiles associated with the streams application actors. The profiles can include historical run-time data, real-time processing data, tuple flow data, machine configuration, or other data relevant processing time, processing demand, or capacity for each streams application actor. The data included in the profile for each streams application actor could also include data about the types of processes conducted by each streams application actor. The profile data could include other data deemed relevant by a system administrator or user to fusion recommendations.

Based on the streams application actor profiles, the system can detect a set of two or more streams application actors that is a potential fusion candidate. The two or more candidates may be identified based on one or more fusion candidate rules. These rules can be set by an administrator, determined by an individual programmer, or in another way. For example, a rule could be that if two operators are performing a similar function, and the input and output time of the first operator is a majority of the processing time for the operation, the first and second operators may be identified as the fusion candidate set. Once the set is identified as satisfying a fusion candidate rule, the identity of each of the streams application actors (e.g., operators one and two), along with the recommendation to fuse the two, may be displayed on a user interface. Other data useful to a developer could also be displayed on the user interface, as described herein. This user interface may be a part of an integrated development environment. It could also be a part of another type of performance management display. Thus, a developer could receive indications or "hints" as to how the distribution of process across an operator graph may be improved. The developer can also be provided with real-time and historical data, and analysis of this data, to determine the appropriateness of the fusion recommendation to the particular operator graph.

FIG. 1 illustrates one exemplary computing infrastructure 100 that may be configured to execute a stream computing application, according to some embodiments. The computing infrastructure 100 includes a management system 105 and two or more compute nodes 110A—110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
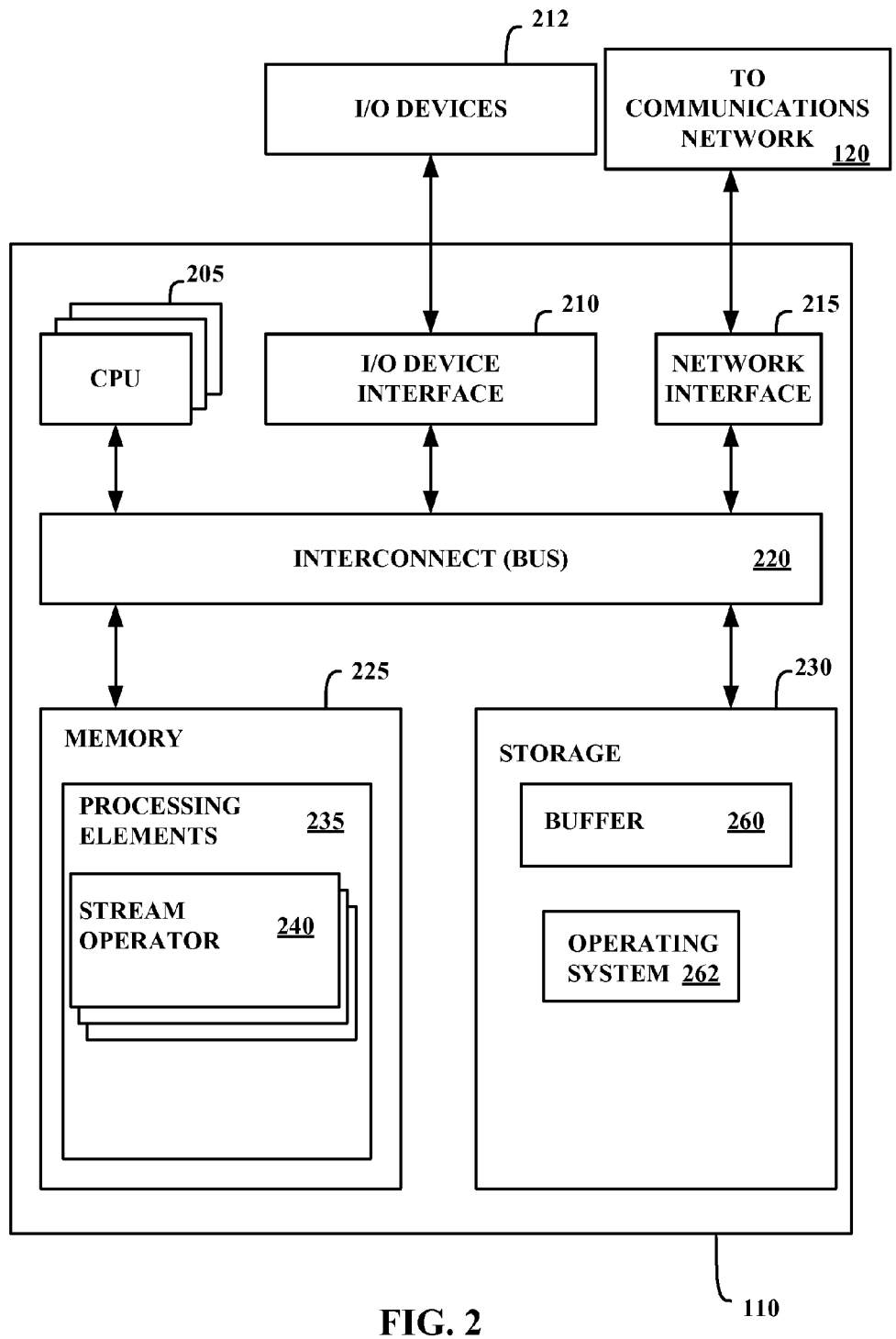
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
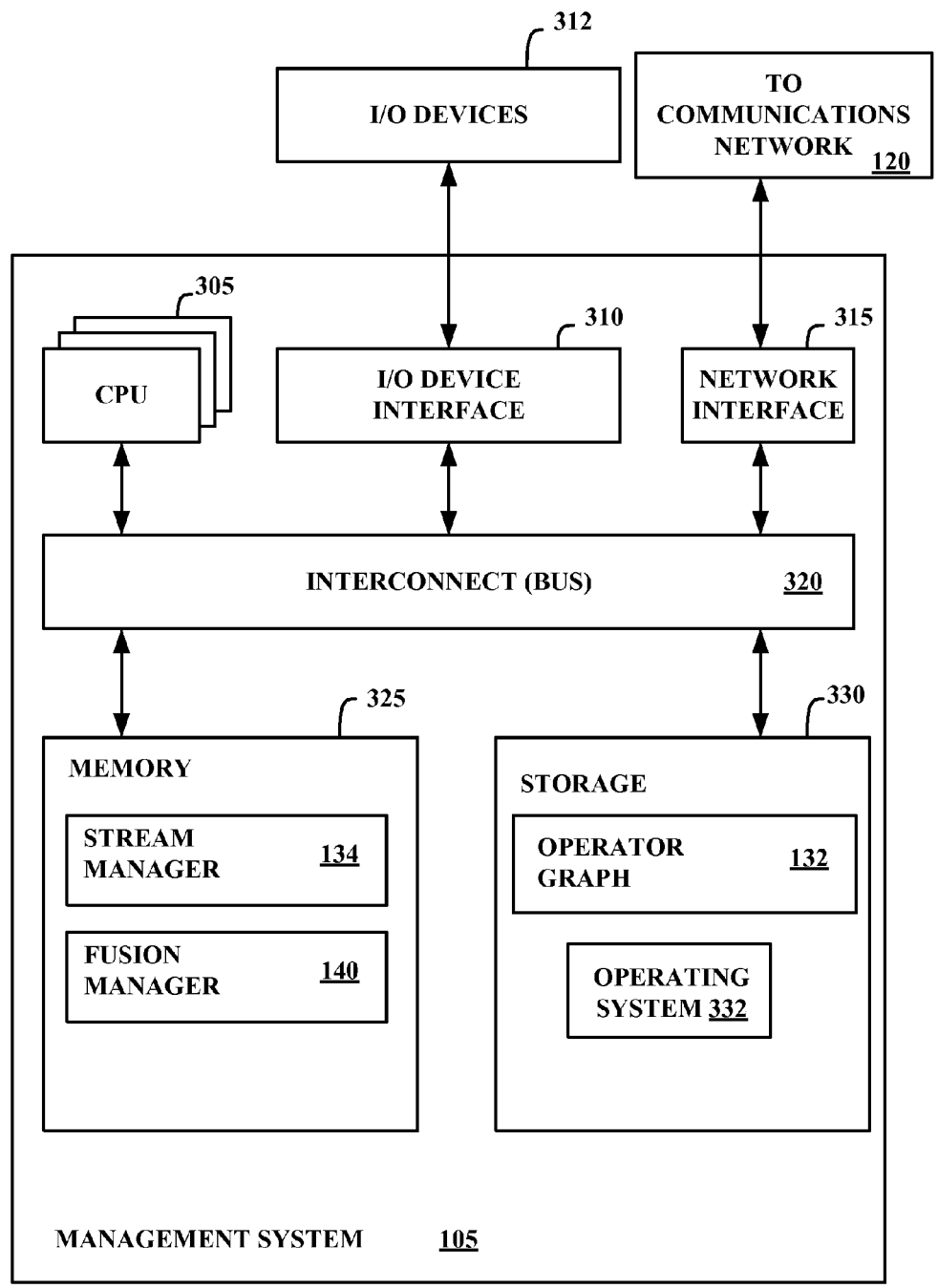
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
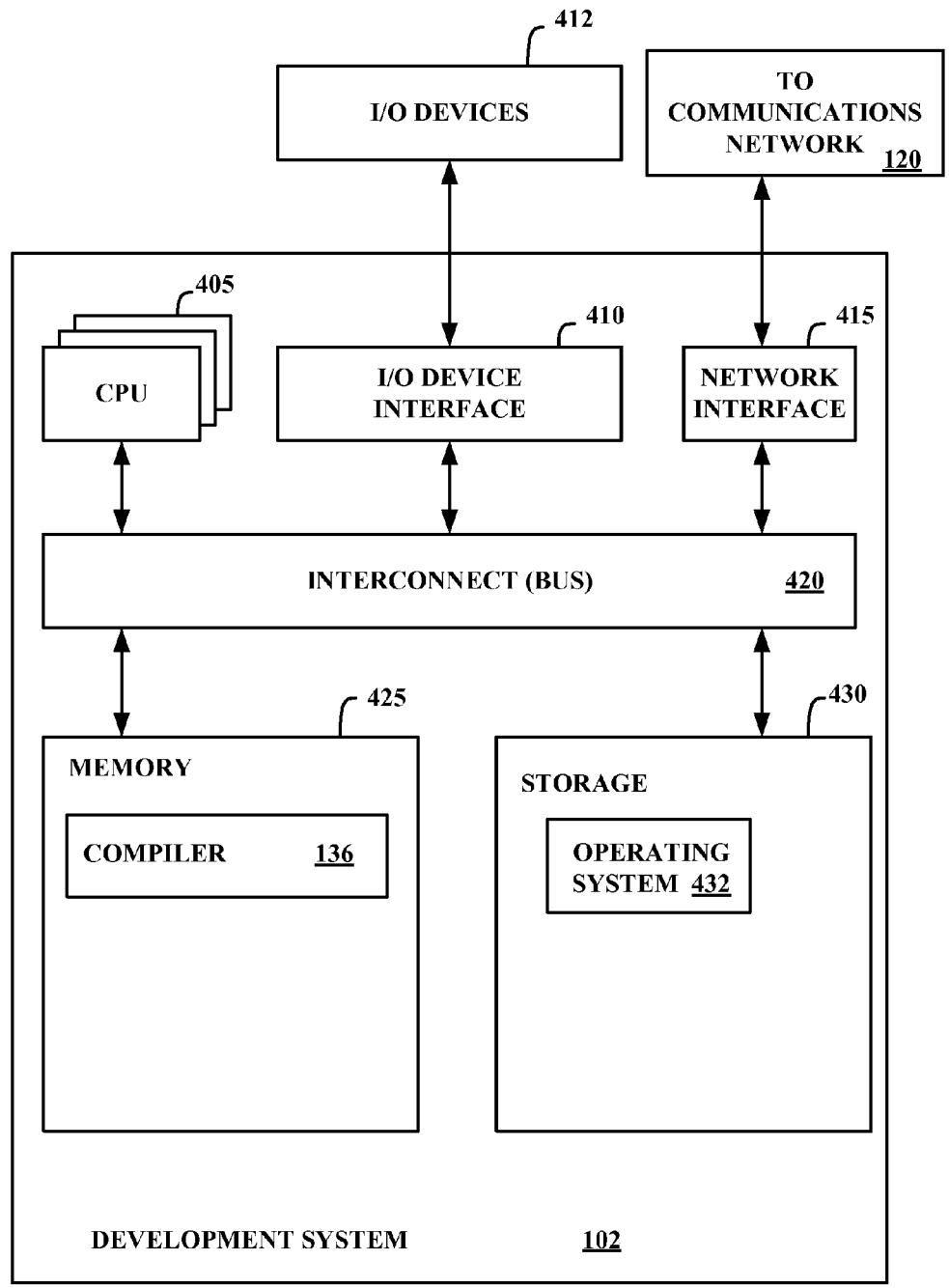
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
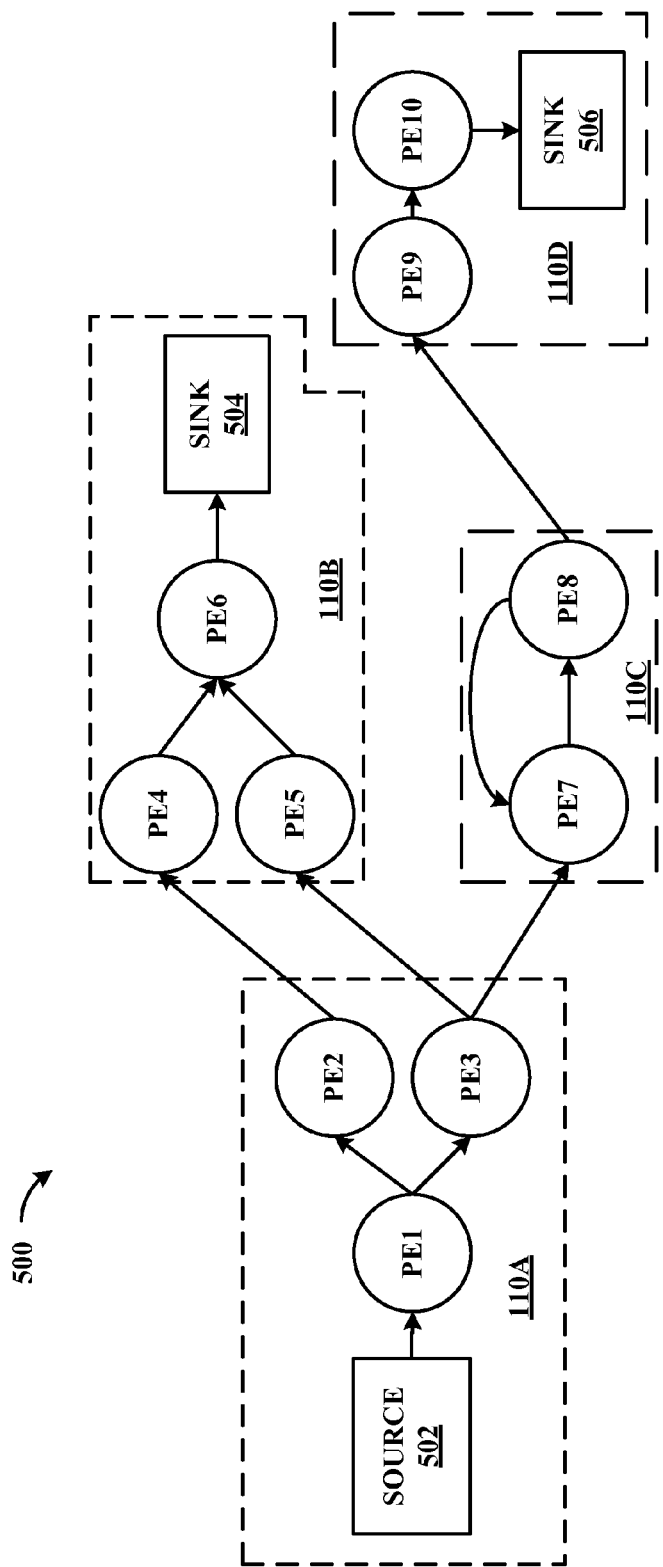
FIG. 5 illustrates an operator graph for a stream computing application, according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) dispersed over and running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 before being transmitted to a sink 504. Similarly, tuples flowing from PE3 to PE5 also reach PE6 and are sent to a sink 504. Thus, PE6 could be configured to perform a join operation, combining tuples received from PE4 and PE5, before sending the data to the sink 504. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in PE10 before being sent to a sink 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
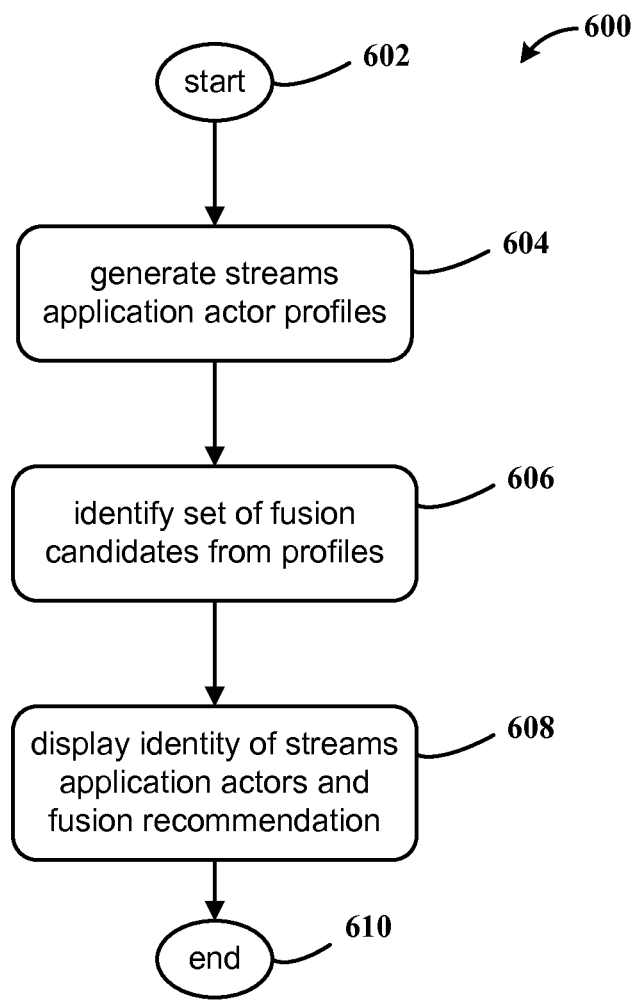
FIG. 6 illustrates a flow diagram for making fusion recommendations for streams application actors, according to various embodiments.

FIG. 6 illustrates a flow diagram for recommending streams application actors as fusion candidates, according to various embodiments. The method 600 can start, per 602, when profiles are generated for each streams application actor, per 604. A streams application actor could be, for example, a streams operator, a processing element, or another processing entity in a streams operator graph. Each profile can include data relevant to the particular streams application actor. For example, a profile could include historical central processing unit (CPU) usage, current or real-time CPU usage, processing speeds, tuple rates, and other data relevant to the data processing occurring over a particular streams application actor. A profile can be created for each streams application actor on a particular operating graph within a streams processing environment.

From the profiles, a set of fusion candidates may be identified, per 606. For example, three streams operators could have profiles with historical usage data that indicates that, when running on the same hardware configuration as in the past, the operators would be able to more quickly process data (e.g., with fewer delays) if they were fused together in a single processing element. This could be based on a parameter or set of parameters established by an application manager or a system administrator, or in another way. A determination that two or more streams application actors (e.g., stream operators) are fusion candidates may also indicate that the streams application actors can be separated from a same processing element (e.g., "un-fused"). Thus, a fusion candidate recommendation can recommend that the streams application actors be merged or separated.

The identity of the streams application actors and the fusion candidate recommendation may then be displayed, per 608. The fusion candidate rule satisfied by the streams application actors can also be displayed. For example, identifying data about each of the three streams operators can be displayed. The recommendation to fuse the three operators into a single processing element can also be displayed. The rule or parameter that was met in order to qualify them as fusion candidates could also be displayed. Other data which could be helpful to a developer or other user in determining whether or not the fusion candidate recommendation should be accepted can also be displayed. As indicated herein, the display can be a part of a user interface that is part of a job execution recommendation of a performance management system. Or, for example, an integrated development environment (IDE) could display the results to a developer, in order to hint to the developer an appropriate configuration or reconfiguration for a particular portion of an operator graph. The method can then end, per 610. The system can also continue to monitor for fusion candidates, continue to update the streams application actor profiles, and generate new profiles as streams application actors are added to a graph.

Figure 7:
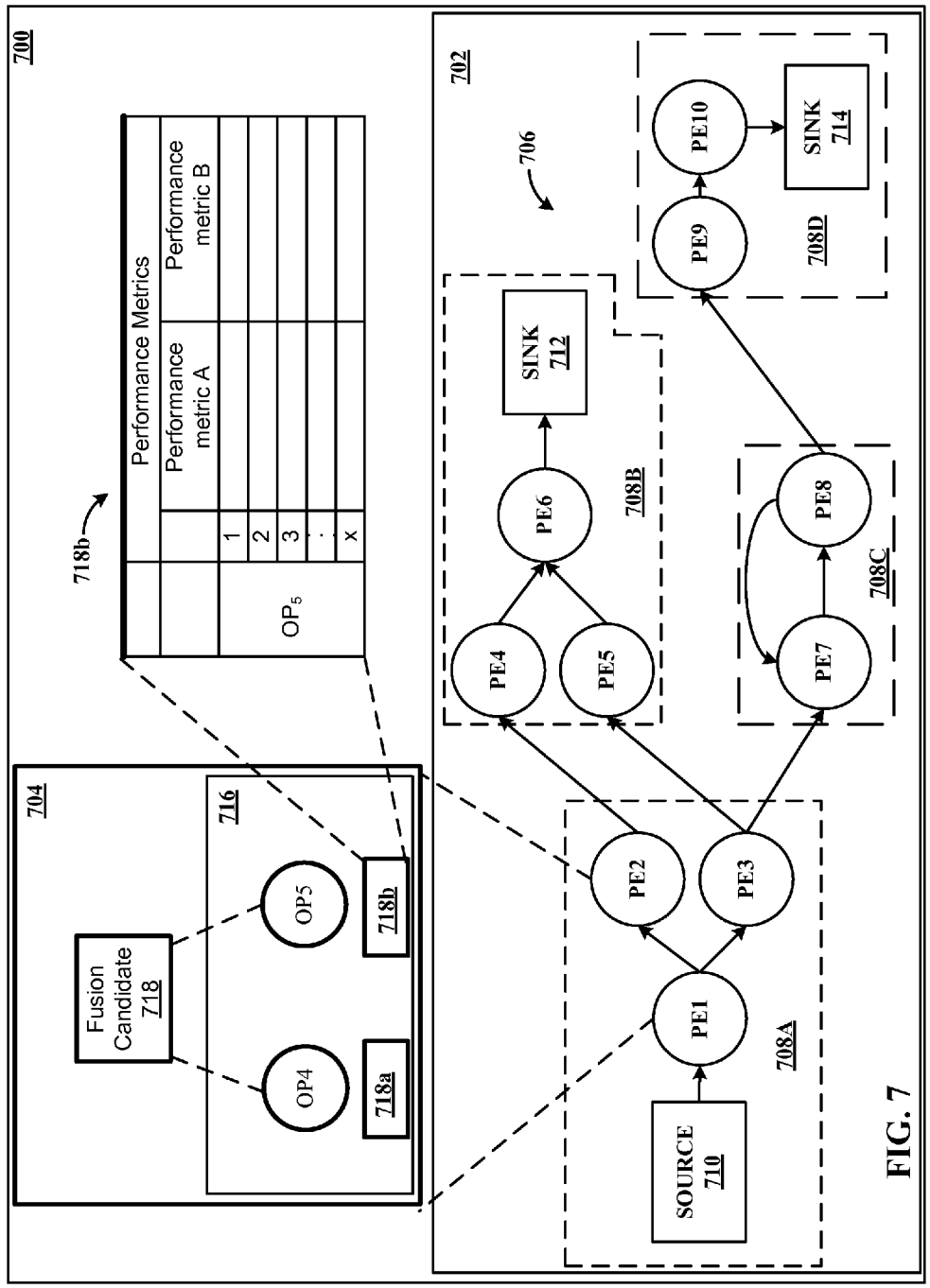
FIG. 7 illustrates a block diagram of a user interface, according to various embodiments.

FIG. 7 illustrates a block diagram of a user interface 700, according to various embodiments. The user interface 700 may be a graphical user interface and may be displayed on one or more I/O devices (e.g., I/O devices 212 in FIG. 2), and the user interface 700 may be generated by one or more processors (e.g., processors 205 in FIG. 2) executing instructions contained in a stream manager or stream computing application (e.g., stream manager 134 in FIG. 1 or stream computing application 232 in FIG. 2).

A user presented with the user interface 700 can monitor a stream computing application. The user interface 700 can also provide a visual representation of the processes of the various streams computing elements including streams application actors. The user interface 700 can also present a user with one or more fusion candidate recommendations and relevant metrics associated with the fusion candidate recommendation.

The user interface 700 can include, individually or in combination, a graphical display (e.g., 702 and 704), a tabulated display (e.g., 718b), or any other representation suitable for a user. For example, graphical display 702 can provide a graphical overview of a current operator graph 706 that is being developed, monitored, or edited. As described herein, within a streams computing environment operator graph 706 can comprise a number of compute nodes 708A, 708B, 708C, and 708D. Each compute node can host a number of processing elements (PE1-10) that process tuples of data as they flow from a source 710 to a sink 712 or 714. Not pictured in graphical display 702 of the operator graph 706 are individual stream operators, which may comprise one or more processing element (PE1-10). In embodiments, each processing element (e.g., PE1), may be a selectable option, which allows a user to select the processing element in order to see the one or more stream operators or other streams application actors that comprise the processing element.

The operator graph 706 depicted herein may correspond to the graph illustrated in FIG. 5. Data points or performance metrics for a compute node 708 or each particular processing element may also be included on the operator graph 706. In this way, a user presented with the user interface 700 can view particular operations in the operator graph 706, while still maintaining a perspective of the overall data processing occurring over the entire operator graph 706.

The user interface 700 can also include a graphical display 704 that includes a fusion candidate recommendation 718. The graphical display 704, which herein may be referred to as a "fusion recommendation window" can include both the fusion candidate recommendation 718 and a data window 716, which can include additional data related to the fusion candidate recommendation.

For example, the fusion recommendation window 716 may include a graphical representation of the two or more streams operators for which fusion or separation is being recommended (e.g., OP4 and OP5). It may also include text or a graphical depiction which indicates that the operators are to be fused or separated. It may also include tabular data for each of these operators, here 718a-b. An example of this tabular data 718b is depicted for illustrative purposes. This tabular data 718b can include data specific to each particular streams application actor that has been identified as a fusion candidate (e.g. OP 5). Example non-limiting performance metrics can include: tuple flow rates, processing power demand, location of operator processing, hardware configurations, or other data. Further discussion of the performance metrics that may be included in a tabular display 718b may be found at FIG. 9.

The graphical and tabular displays depicted in FIG. 7 are intended to provide examples only and are not intended to restrict the appearance or values present on the user interface 700. Rather, the various displays, arrangement of the displays, types of data shown, and other features may be configured to accommodate user needs or preferences.

Figure 8:
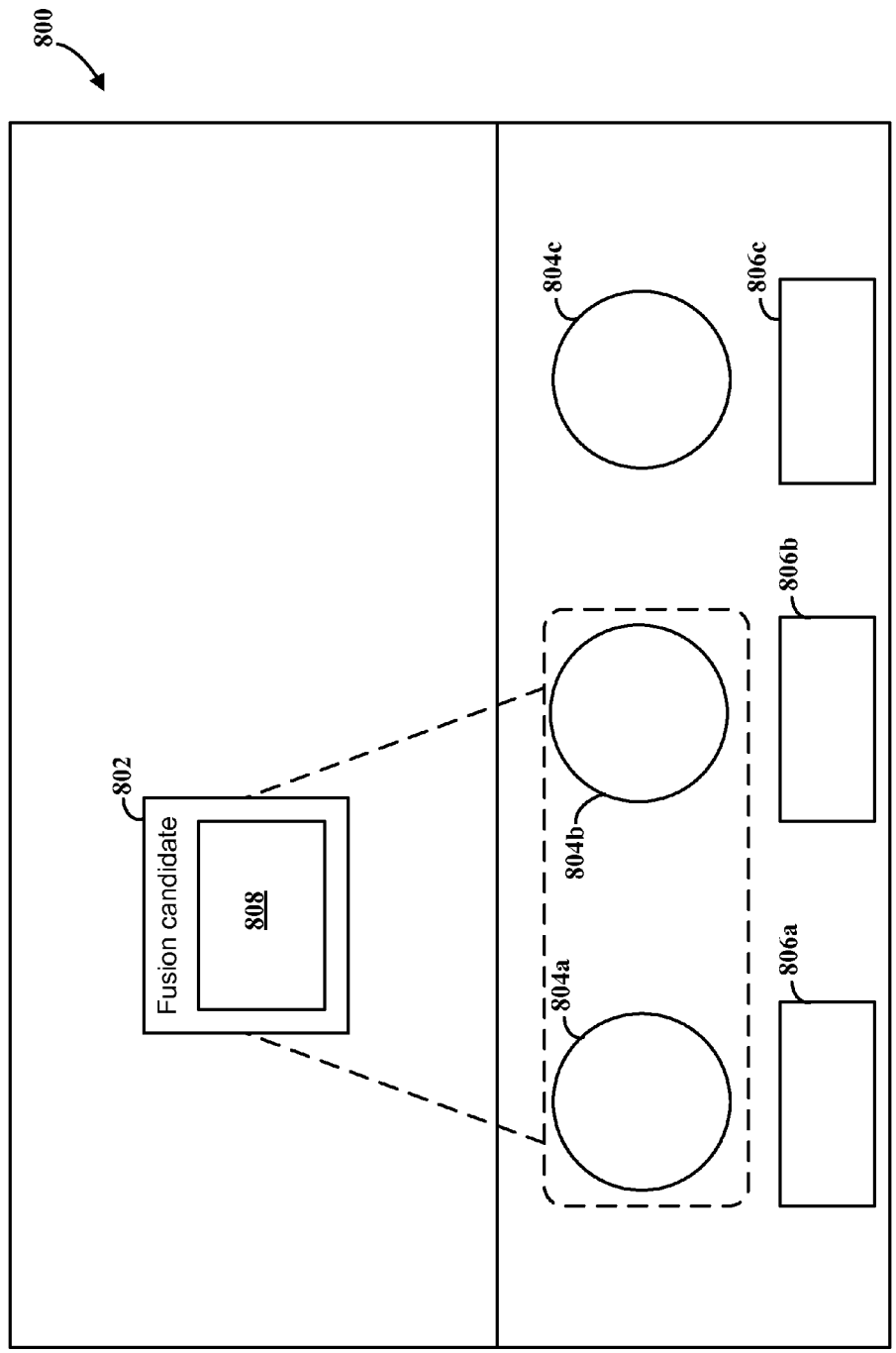
FIG. 8 illustrates a block diagram of a user interface, according to various embodiments.

FIG. 8 illustrates a graphical display, according to embodiments. The graphical display 800 can be a part or the whole of a user interface. The user interface may be a part of an IDE for a streams computing application. The graphical display 800 may be phase-integrated into a more complex user interface (e.g., graphical display 704 in FIG. 7). Like its counterpart graphical display 704 in FIG. 7, graphical display 800 may be referred to as a fusion recommendation window 800.

For example, the fusion recommendation window 800 can include one or more graphical depictions of streams operators 804a, 804b, 804c, or other streams application actors that may be candidates for fusion. Here, operators 804a and 804b have been identified as candidates for fusion, as described herein. In the example illustrated here, streams operator 804c has not been selected as a candidate for fusion. However, one or more surrounding but not recommended streams operators (e.g., 804c) may be included in the fusion recommendation window 800. These may be displayed based on a setting or based on a threshold value, or in another way. For example, a user may set a threshold that if reached, indicates that the recommended operators are extremely strong candidates for fusion. If that threshold is reached, then surrounding operators that are not candidates for fusion (here 804c) may not be displayed. However, if the threshold is not reached based on various metrics, then the failure to meet the threshold could indicate that the recommended operators are only moderately strong candidates for fusion. In this case, where the threshold is not reached, one or more surrounding operators (and the performance metrics 806c of those one or more surrounding operators) may be displayed in the fusion recommendation window 800. This way, a user (e.g., a developer) can, with relative ease, access and use surrounding performance data in confirming or denying fusion recommendations.

Figure 9:
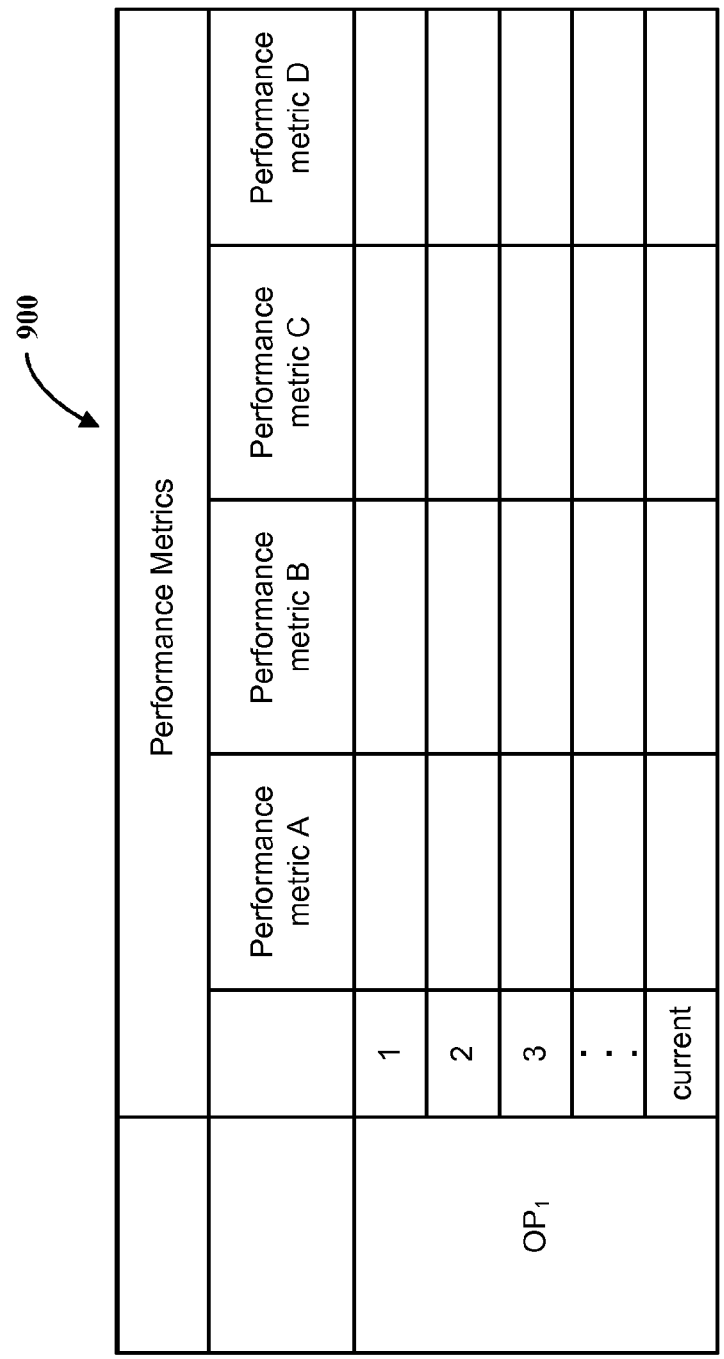
FIG. 9 illustrates a tabular display, according to various embodiments.

Each streams operator 804 (or other streams application actor) may be displayed with performance metrics or other relevant data associated with the stream operator. This data may be displayed in one or more tables 806a-c. Performance metrics can be displayed to assist a user in understanding the reasoning or confidence of a fusion recommendation. FIG. 9 includes more details on this data.

A graphical representation may indicate to a user that the one or more streams operators 804a and 804b are candidates for fusion. This recommendation 802 may appear as a selectable option, a graphic, or in other manner. For example, the recommendation 802 may include a selectable option 808. This option could link to performance metrics, analysis, or other data that can help the user understand why the recommendation was made. The data in selectable option 808 could also indicate performance benefits from fusing or separating the operators, or other data. Elements described herein are provided for illustrative purposes only, and a graphical display or fusion recommendation window 800 may be configured to any appearance or design deemed useful. For example, if the IDE in which the fusion recommendation window 800 is contained is for a streams computing environment that is very complex and developed with little human interaction, the fusion recommendation window 800 may be configured to display fewer performance metrics, and the fusion may occur automatically (i.e., without additional user input) upon, for example, exceeding a particular threshold. However, in an IDE for a streams computing application that is less complex or where more precision or severability may be desired, the system may display the aforementioned data and more, in order to provide the developer with as much useful data as possible, so that the developer can be well-informed to make a decision relatively independent of the system's recommendation.

FIG. 9 illustrates a tabular display 900 according to embodiments. The tabular display 900 may be a table like the example one shown here. The table is not limited to the categories given here, and may include performance metrics, analytics, fusion details, or other categories. The table shown here indicates performance metrics for a particular streams operator, OP1. As described herein, example performance metrics include: tuple flow rates, processing power demand, location of operator processing, hardware configurations of processing, or other data. These metrics may be displayed in a table for each particular operator of interest.

For example and as illustrated here, the performance metrics may be listed as an individual column, including: Performance metric A, Performance metric B, Performance metric C, and Performance metric D. Additional or fewer columns may be included, in order to suit the preferences of a particular user. Another column, here including "1", "2", "3", . . . "current" indicates the particular processing cycle for which the performance metrics were calculated. Additional rows including projected or speculative metrics for future processing cycles could also be included. The column may be configured to display between one or all processing cycles, may be selectable in order to see additional data (e.g., hardware configurations) associated with the particular cycle, and may be updated in real-time to reflect the most current processing metrics. In this way, historical data can be observed and used by a user in analysis of a fusion recommendation. The table 900 could also be used in making other determinations. In other embodiments, performance metrics may be listed in another type of visual display, including a graph, chart, or other type of visual display.

Additionally, the tabular data updated in real-time and displayed in table 900 can be used by a developer in order to monitor the effects of a fusion or separation, after the fact and in real-time. For example, if a fusion recommendation window (e.g., 800 in FIG. 8) contained predictive data that indicated CPU usage would be decreased by x % upon a fusion of three particular operators, the developer could accept the fusion recommendation and monitor the processing consumption for the next y number of cycles to determine whether or not the predication was accurate. In this way, a developer can monitor in real-time the impact and efficacy of the fusion or separation of particular types of operators, and adjust thresholds or other recommendation configurations accordingly.

Figure 10:
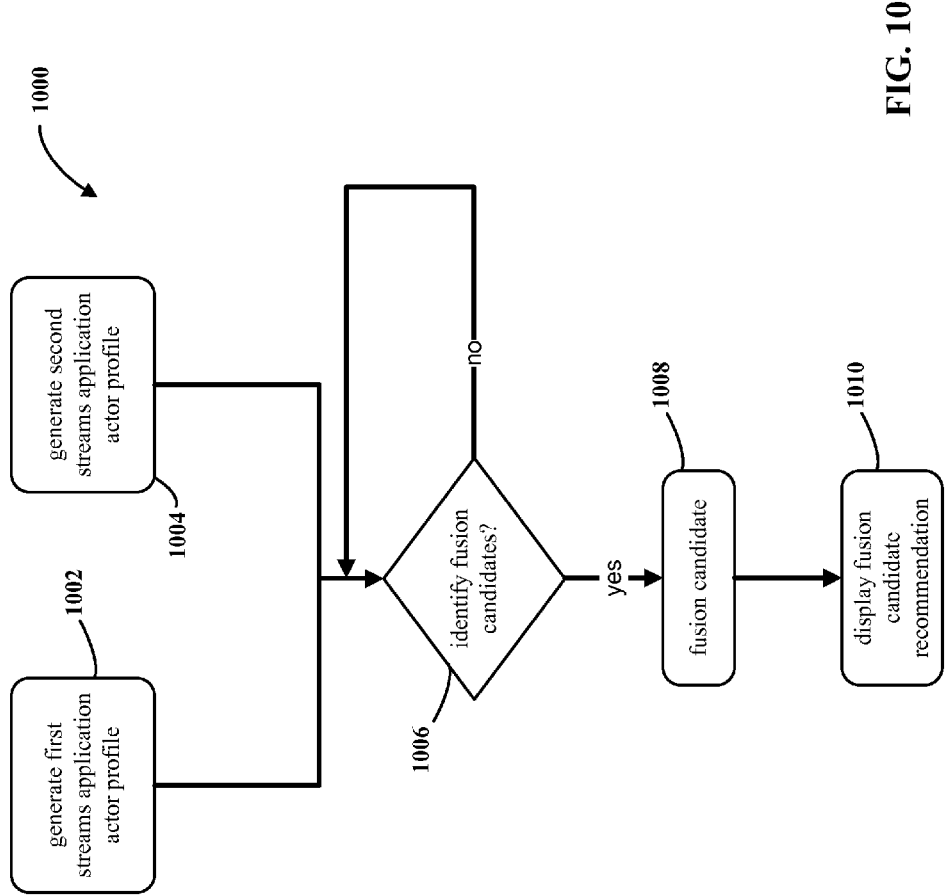
FIG. 10 illustrates a method for recommending fusion candidates in a streams computing environment, according to various embodiments.

FIG. 10 illustrates a method 1000 for recommending fusion candidates in a streams computing environment, according to various embodiments. The method 1000 begins when a first streams application actor profile is generated, per 1002, and a second streams application actor profile is generated, per 1004. These profiles can be generated simultaneously or in any order. For ease of discussion, only two streams application actors, and only two streams application actor profiles are being described, however, profiles may be developed and maintained for each streams application actor (e.g., stream operators, processing elements, or other actors) in an operator graph. If two or more profiles satisfy a fusion candidate rule, per 1006, the streams application actors associated with the profiles may be identified as fusion candidates, per 1008. The fusion candidates' identities could then be displayed as recommended candidates for fusion or separation, along with the recommendation to fuse or separate the actors, per 1010. Other data could be displayed with this recommendation including data regarding the recommendation like detected or evaluated inefficiencies that could be alleviated by the fusion or other data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
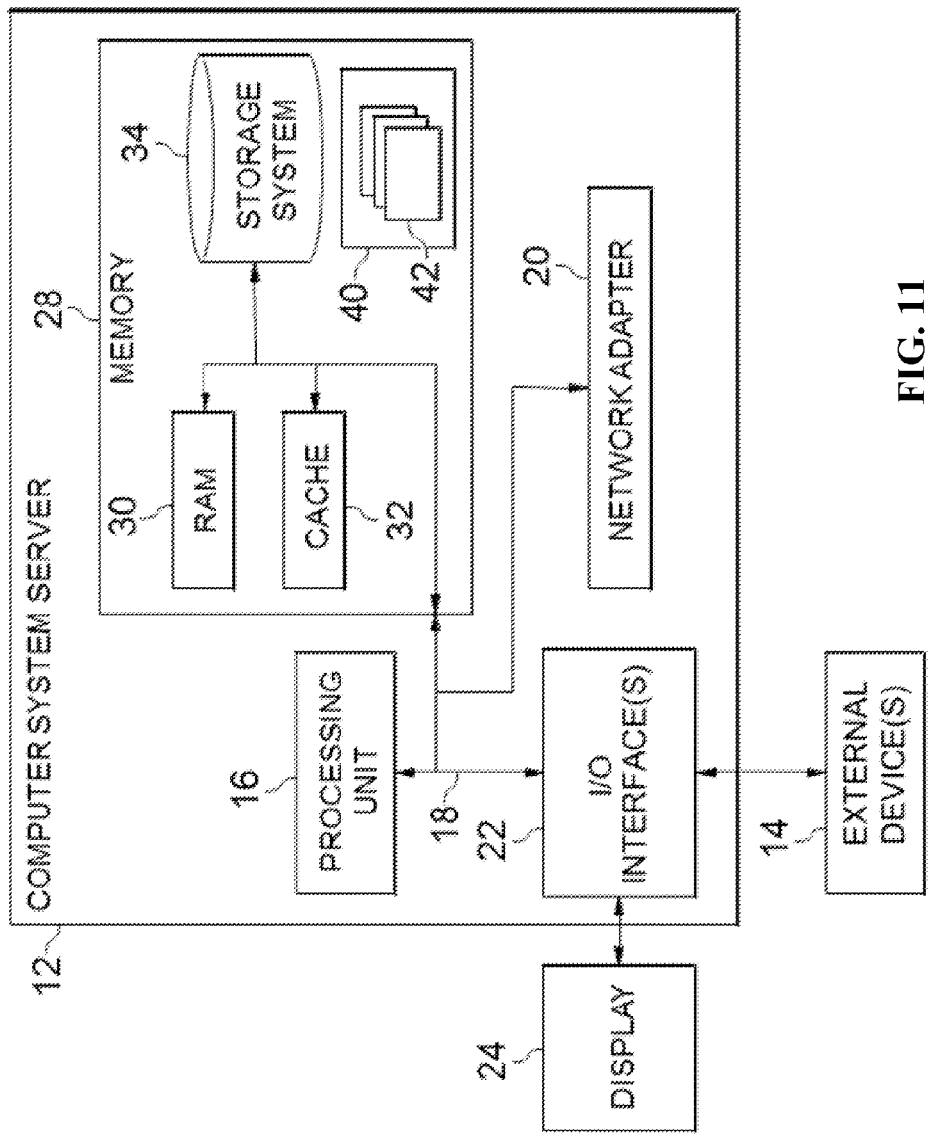
FIG. 11 depicts a cloud computing node according to an embodiment of the present invention.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
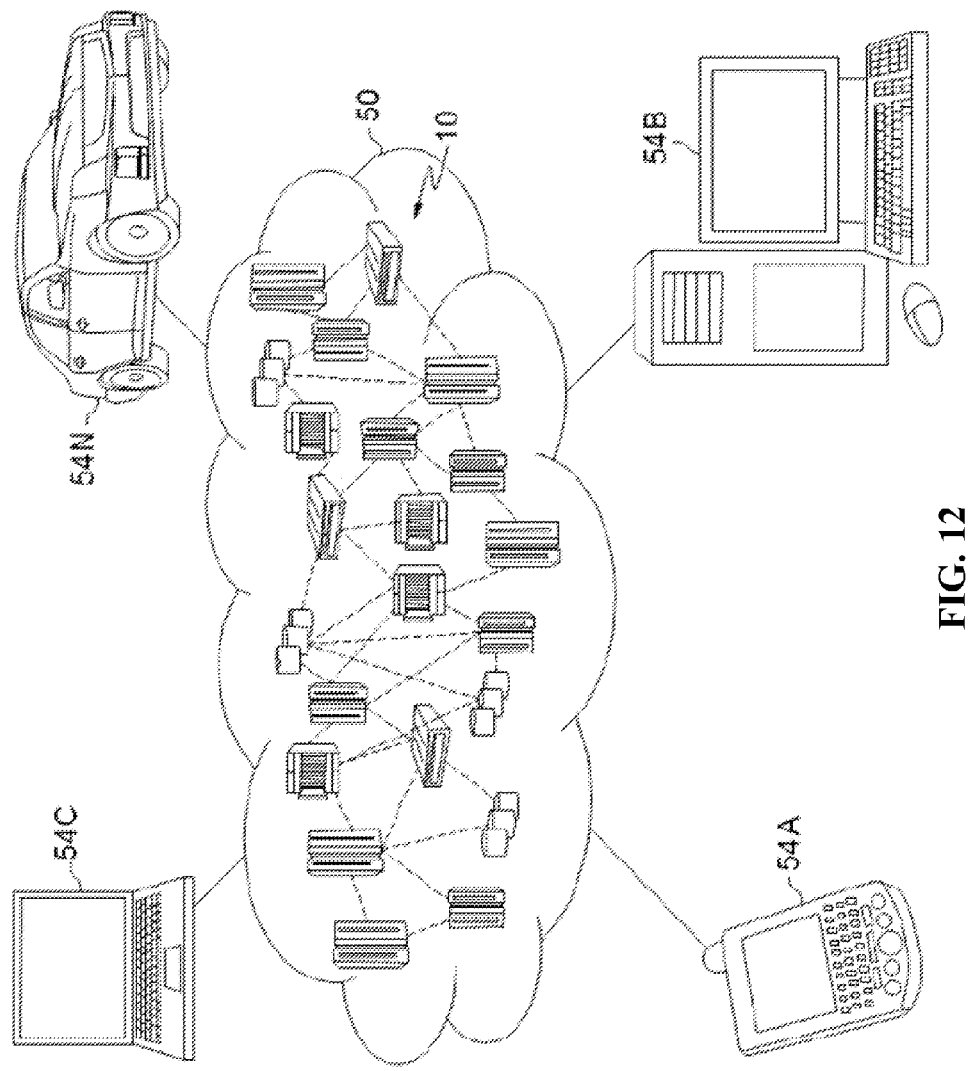
FIG. 12 depicts a cloud computing environment according to an embodiment of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
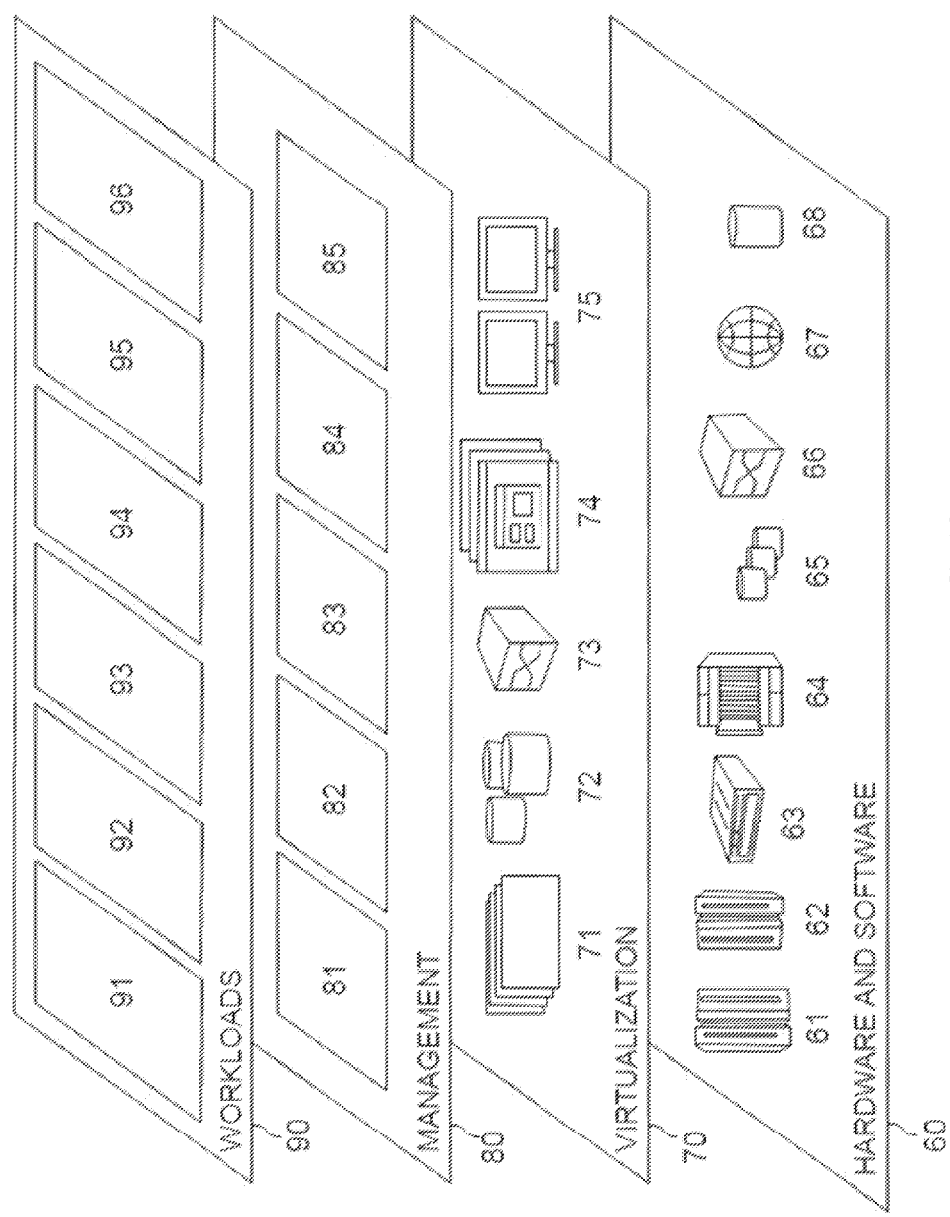
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing fusion hints 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for recommending streams application actors for fusion, wherein the streams application actors are dispersed on an operator graph within a streaming environment, the method comprising:
   generating, for each of two or more streams application actors in the operator graph, a streams application actor profile;
   determining, from streams application actor profiles for two or more streams application actors, the two or more streams application actors are fusion candidates, wherein the determining is based on streams application actor profile data, including historical runtime data and real-time processing data, and based on the streams application actors satisfying at least one fusion candidate rule from a set of fusion candidate rules, each fusion candidate rule associated with one or more fusion recommendations, wherein the fusion recommendation includes reconfiguration data for a particular portion of the operator graph;
   identifying, in response to the determining, a fusion recommendation from the one or more fusion recommendations associated with the at least one fusion candidate rule;
   displaying, in response to the identifying, an identity of each of the two or more streams application actors, the fusion recommendation, and the reconfiguration data for a particular portion of the operator graph, wherein the displayed fusion recommendation shows a table indicating the current performance of the two or more streams application actors and one or more predicted performance of future processing cycles of the two or more streams application actors each performance associated with the implementation of the fusion recommendation; and accept the fusion recommendation, and automatically apply, by a compiler, the accepted fusion recommendation to the two or more streams application actors and reconfiguring the particular portion of the operator graph.

2. The method of claim 1, wherein the fusion recommendation is to fuse the two or more streams application actors into a same processing element.

3. The method of claim 1, wherein the fusion recommendation is to separate the two or more streams applications actors from a same processing element.

4. The method of claim 1, wherein the data about the streams application actor further comprises historical central processing unit (CPU) usage, tuple rates, machine configuration, and current CPU usage.

5. The method of claim 1, wherein the displaying the identity of each of the two or more streams application actors and the fusion recommendation occurs via a user interface.

6. The method of claim 5, wherein the user interface is part of a job execution design recommendation of a performance management system.

7. The method of claim 6, wherein the performance management system is an integrated development environment.

8. The method of claim 1, wherein the set of fusion candidate rules comprises a set of performance thresholds, wherein a particular fusion candidate rule is met if a particular performance threshold in the set of performance thresholds is met.

9. The method of claim 8, wherein the set of performance thresholds comprises thresholds that are correlated with processing speed.

10. The method of claim 8, wherein the set of performance thresholds comprises thresholds that are correlated with improved CPU usage.

11. The method of claim 1, wherein each streams application actor is a streams operator.

* * * * *